United States Patent
Chen

(10) Patent No.: US 7,341,227 B2
(45) Date of Patent: Mar. 11, 2008

(54) ADJUSTABLE WRIST PAD

(75) Inventor: Chun Lin Chen, Taipei County (TW)

(73) Assignee: Chicony Electronics Co., Ltd., Taipei Hsien (TW)

( * ) Notice: Subject to any disclaimer, the term of this patent is extended or adjusted under 35 U.S.C. 154(b) by 284 days.

(21) Appl. No.: 10/897,003

(22) Filed: Jul. 23, 2004

(65) Prior Publication Data

US 2005/0127249 A1    Jun. 16, 2005

(30) Foreign Application Priority Data

Dec. 10, 2003    (TW) .............................. 92221679 U

(51) Int. Cl.
*B68G 5/00*    (2006.01)

(52) U.S. Cl. .................... 248/118; 248/918

(58) Field of Classification Search ............. 248/118.1, 248/118.3, 918, 221.11, 222.11, 222.12
See application file for complete search history.

(56) References Cited

U.S. PATENT DOCUMENTS

| | | | | |
|---|---|---|---|---|
| 5,145,136 A | * | 9/1992 | McConnell | 248/284.1 |
| 5,660,360 A | * | 8/1997 | Yang | 248/118 |
| 5,931,537 A | * | 8/1999 | Gollin et al. | 297/411.36 |
| 6,332,596 B1 | * | 12/2001 | Su | 248/118.1 |
| 6,478,266 B1 | * | 11/2002 | Tsau | 248/118.1 |
| 7,086,634 B1 | * | 8/2006 | Kirchhoff | 248/286.1 |

* cited by examiner

*Primary Examiner*—Carl D. Friedman
*Assistant Examiner*—Steven Marsh
(74) *Attorney, Agent, or Firm*—Bacon & Thomas, PLLC

(57) ABSTRACT

An adjustable wrist pad for mating a keyboard and a wrist pad base is provided, which comprises a sliding board and a fastening base. The sliding board is provided with a plurality of positioning holes with an engaging portion extended from each of the two ends of one side of the sliding board. The fastening base includes a first housing and a second housing mutually correspondent to each other. Each of the first housing and the second housing is provided with an elastic arm on the middle thereof. A projection is provided on one lower part of the elastic arm of the first housing and corresponds to one of the positioning holes of the sliding board, whereas another projection is provided on one upper part of the elastic arm of the second housing and corresponds to the same positioning hole. The present adjustable wrist pad is formed as a modularized structure, which can connect the keyboard and the wrist pad base. By moving the sliding board, the projections in one positioning hole are moved to another positioning hole so as to adjust the position of the adjustable wrist pad.

12 Claims, 6 Drawing Sheets

ADJUSTABLE WRIST PAD

BACKGROUND OF THE INVENTION

1. Field of the Invention

The present invention relates to an adjustable wrist pad, especially to a modularized adjustable wrist pad for connecting a keyboard and a wrist pad base.

2. Discription of the Related Art

Conventionally, a computer keyboard is provided with certain thickness, so when the computer keyboard is placed on a table or plane surface, such thickness turns into a certain height that makes users of the computer keep their hands lifted. If holding such hand-lifting posture for a long time, users' wrists and hands are prone to tense, and even causing physical illness.

In view of the foregoing drawbacks, certain types of keyboards are produced for improvements. These keyboards are provided with inclined wrist pad bases extended from their front edges, intending to bring comfort to and prevent illness of the users by offering the wrist pad bases for the users to lay their wrists. Nevertheless, these products are usually provided with the wrist pad base being integrally fixated at the front edge of the keyboard such that the disassembling of them becomes difficult and their volume enlarged, increasing the difficulty of packaging and transportation. Moreover, to produce such computer keyboards with such wrist pad bases requires additional manufacturing of modules. Thus, not only the existing modules become useless, but also the production cost is raised.

For resolving the above drawbacks, R.O.C. Patent No. 342964 discloses an improved structure of wrist pad base for computer keyboards, comprising: a keyboard, a wrist pad base, and two connecting plates disposed between the keyboard and the wrist pad base. Each of the two sides of the bottom surface of the keyboard is disposed with an elongated groove for engaging the connecting plate so as to connect the wrist pad base, and a groove is provided on a proper location at each of the two sides of the bottom surface of the wrist pad base. The connecting plate is positioned in the groove so that the keyboard and the wrist pad base are connected together, and that a keyboard with a separable wrist pad base is formed. Alternatively, when the keyboard and the wrist pad base are separated, the connecting plates can be received in the wrist pad base so the keyboard and the wrist pad base can be sold separately as two different commodities.

Such improvement does resolve the problem of incapable of separating the wrist pad base and keyboard, yet there are two problems remained: 1. although the wrist pad base can be assembled to and disassembled from a keyboard, it is unable to adjust the position of the wrist pad base in accordance with the need of individual user; 2. because the connecting plate is not modularized, additional modules for the connecting plate are required when manufacturing the wrist pad base, thus the structure of the wrist pad base becomes so complicated that the injection condition of the wrist pad base becomes extraordinarily different.

SUMMARY OF THE INVENTION

An object of the present invention is to provide an adjustable wrist pad comprising a sliding board and a fastening base. Because the sliding board and the fastening base are provided as a modularized structure, the adjustable wrist pad is able to connect to various keyboards and wrist pads. A purpose of cost down thus can be attained.

Another object of the present invention is to provide an adjustable wrist pad in which projections of elastic arms of the fastening base are located into one of the positioning holes of the sliding board, the projections are caused to move to another one of the positioning holes when the sliding board is moved. Thus, the wrist pad is adjusted.

The adjustable wrist pad for achieving the foregoing objects comprises a sliding board and a fastening base. The sliding board is provided with a plurality of positioning holes, and an engaging portion is extended from each of two ends of one side of the sliding board. The fastening base includes a first housing and a second housing mutually corresponding to each other. The first housing is provided with a plurality of first locking elements at one side and a plurality of second locking elements at the other side. And the second housing is provided with a plurality of first locking elements at one side and a plurality of second locking elements at the other side. The plurality of first locking elements of the first housing is correspondingly engaged with the plurality of second locking elements of the second housing, while the plurality of first locking elements of the second housing is correspondingly engaged with the plurality of second locking elements of the first housing. One lug having a screw hole is provided between at least one pair of the first locking elements and between at least one pair of the second locking elements. Each of the first housing and the second housing is provided with an elastic arm at the middle thereof. A projection is provided at one lower part of each of the elastic arms of the first housing and corresponds to one of the positioning holes of the sliding board, whereas another projection is provided at one upper part of the elastic arm of the second housing and corresponds to the same positioning hole of the sliding board. By moving the sliding board, the projections in one of the positioning holes are caused to move to another one of the positioning holes, and the wrist pad is adjusted.

Each engaging portion is provided with a protruding lug that is engageable with a keyboard.

The second locking elements are formed of one shoulder extended horizontally from the first housing and second housing respectively; each shoulder of the first housing and the second housing is provided with a through hole.

The adjustable wrist pad is engaged in a wrist pad base via a screw passing through the screw hole of the lug of the adjustable wrist pad.

DETAILED DESCRIPTION OF THE PREFERRED EMBODIMENT

The following is a detailed description of the best presently known modes of carrying out the inventions. This description is not to be taken in a limiting sense, but is made merely for the purpose of illustrating the general principles of the inventions.

Figure 1:
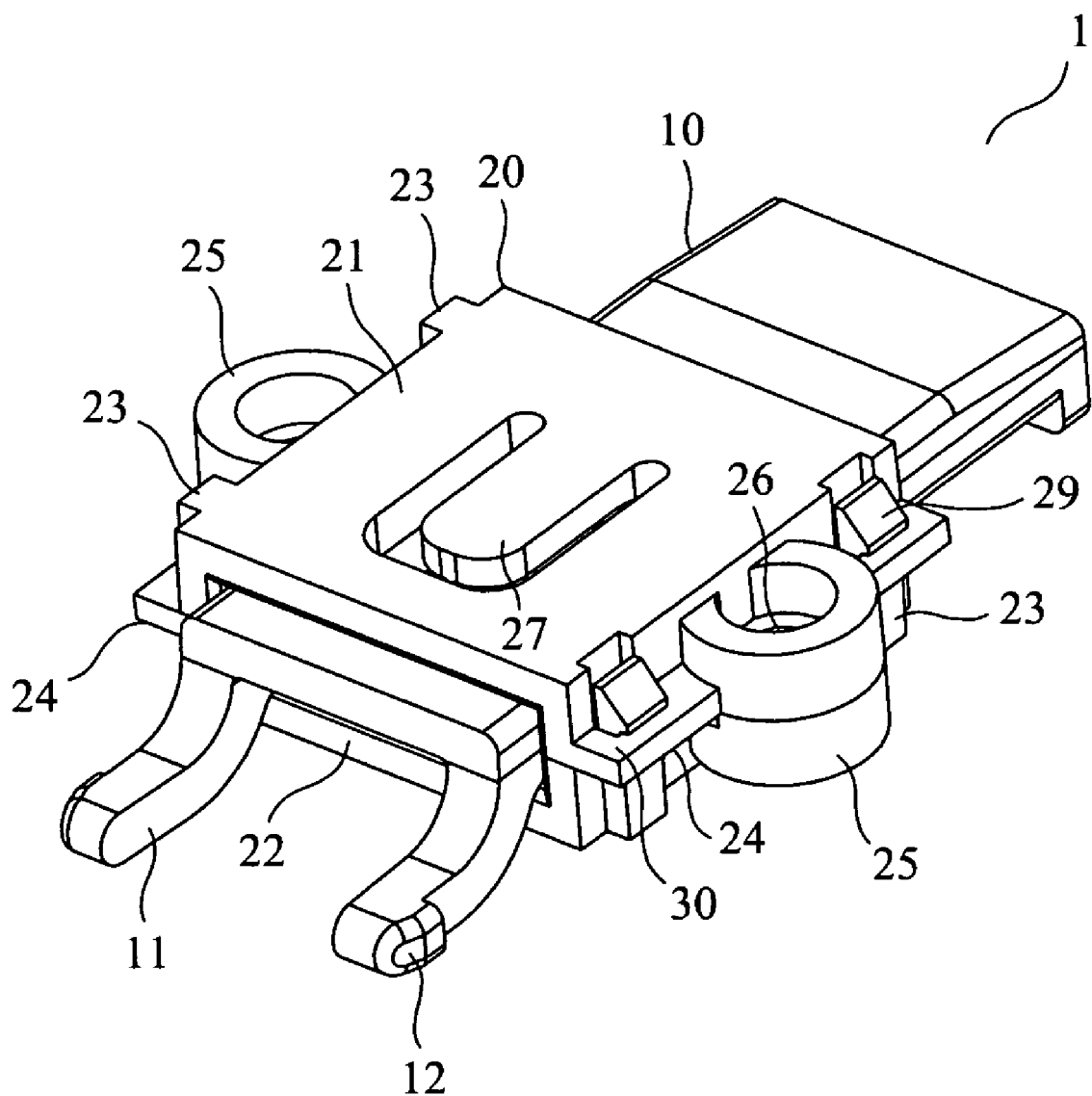
FIG. 1 is a perspective view of the adjustable wrist pad of the present invention.

Please refer to FIG. 1, which is a perspective view of the adjustable wrist pad of the present invention. The adjustable wrist pad 1 of the present invention is a modularized structure, comprising a sliding board 10 and a fastening base 20. The sliding board 10 is provided with a plurality of positioning holes 13 (see FIG. 2) on the middle thereof. An engaging portion 11 is extended from each of the two ends of one side of the sliding board 10, with each engaging portion 11 having a protruding lug 12. The fastening base 20 is composed of a pair of housings mutually correspondent to each other, called the first housing 21 and the second housing 22, respectively. The first housing 21 is provided with a plurality of first locking elements 23 at one side and a plurality of second locking elements 24 at the other side. And the second housing 22 is also provided with a plurality of first locking elements 23 at one side and a plurality of second locking elements 24 at the other side.

One lug 25 having a screw hole 26 is respectively provided between at least one pair of first locking elements 23 and at least one pair of second locking elements 24. Each of the first housing 21 and the second housing 22 is provided with an elastic arm 27 at the middle thereof. A projection 28 is provided on the lower part of the elastic arm 27 of the first housing 21 and corresponds to one of the positioning holes 13 of the sliding board 10, whereas another projection 28 is provided on the upper part of the elastic arm 27 of the second housing 22 and corresponds to one of the positioning holes 13 of the sliding board 10 (see FIG. 2).

Figure 2:
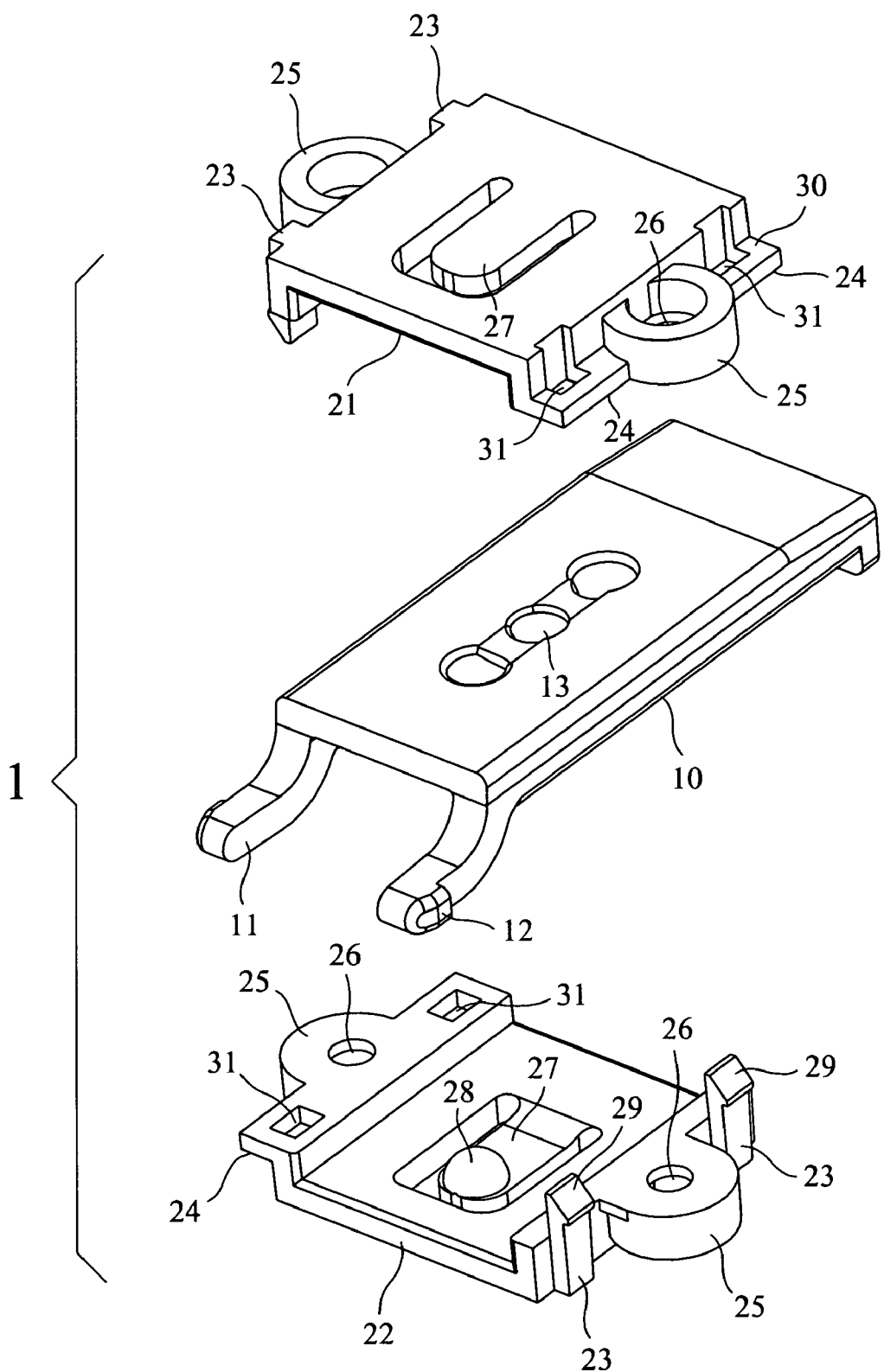
FIG. 2 is an exploded view of the adjustable wrist pad of the present invention.

Please refer to FIG. 1 and FIG. 2, which show an exploded view of the adjustable wrist pad 1 of the present invention. The first locking elements 23 at each of the first housing 21 and the second housing 22 are provided perpendicular to the first housing 21 and second housing 22. A hook 29 is provided at one free end of the first locking element 23. The second locking element 24 is formed of one shoulder 30 having a through hole 31 formed therein, which is extended horizontally from the first housing 21 and second housing 22 respectively. By the mating of the first locking elements 23 of the first housing 21 and the second locking elements 24 of the second housing 22 as well as the mating of the first locking elements 23 of the second housing 22 and the second locking elements 24 of the first housing 21, the first housing 21 and the second housing 22 are combined to form the fastening base 20 of the present invention.

Please refer to FIG. 2. When the adjustable wrist pad 1 of the present invention is to be assembled, initially the sliding board 10 is positioned on the second housing 22, such that the projection 28 of the elastic arm 27 of the second housing 22 is located in one of the positioning holes 13 of the sliding board 10. Then the first locking elements 23 of the first housing 21 pass through the through holes 31 of the second locking elements 24 of the second housing 22. The hook 29 of each first locking element 23 of the first housing 21 engages the shoulder 30 of the second locking elements 24 of the second housing 22. Meanwhile, the first locking elements 23 of the second housing 22 pass through the through hole 31 of the second locking elements 24 of the first housing 21. The hooks 29 of the first locking elements 23 of the second housing 22 engage the shoulders 30 of the second locking elements 24 of the first housing 21. The projection 28 at the elastic arm 27 of the first housing 21 is located in the same positioning hole 13 of the sliding board 10. Thus the connection of the first housing 21 and the second housing 22 is completed. When the sliding board 10 is moved, the projections 28 of the elastic arms 27 located in one of the positioning holes 13 is cooperatively moved to another one of the positioning holes 13. The assembling of the adjustable wrist pad of the present invention is completed.

Figure 3:
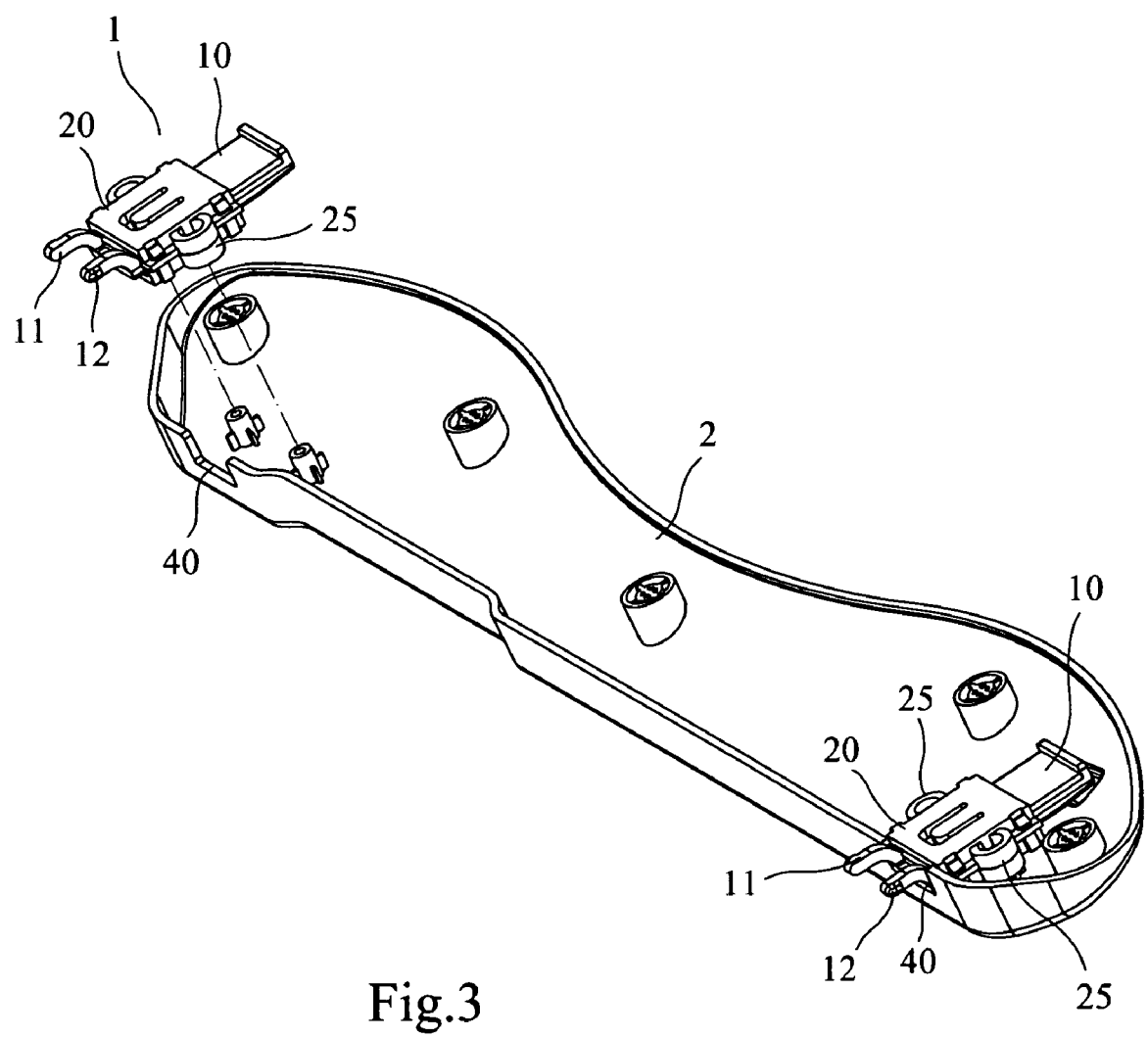
FIG. 3 is a bottom view showing the connection of the adjustable wrist pad and the wrist pad base of the present invention.

Please refer to FIG. 3, which is a bottom view showing the connection of the adjustable wrist pad and the wrist pad base of the present invention. The front edge of the adjustable wrist pad base 2 is higher than the rear edge of the wrist pad base 2, so the surface of the wrist pad base 2 is formed as an inclined plane. A notch 40 is provided at each end of the front edge (the higher edge) of the wrist pad base 2. The notches 40 are provided to allow the engaging portions 11 of the adjustable wrist pad 1 to extend outside the wrist pad base 2 and connect with a keyboard 3 (see FIG. 4). When the adjustable wrist pad 1 is to be mated with the wrist pad base 2, the adjustable wrist pad 1 is positioned in one of the notches 40 of the wrist pad base 2, with the engaging portion 11 extending outside the wrist pad base 2 through the notch 40. Then a screw passes through the screw hole 26 of each of the lugs 25 of the adjustable wrist pad 1 to securely fasten the adjustable wrist pad 1 in the wrist pad base 2.

Figure 4:
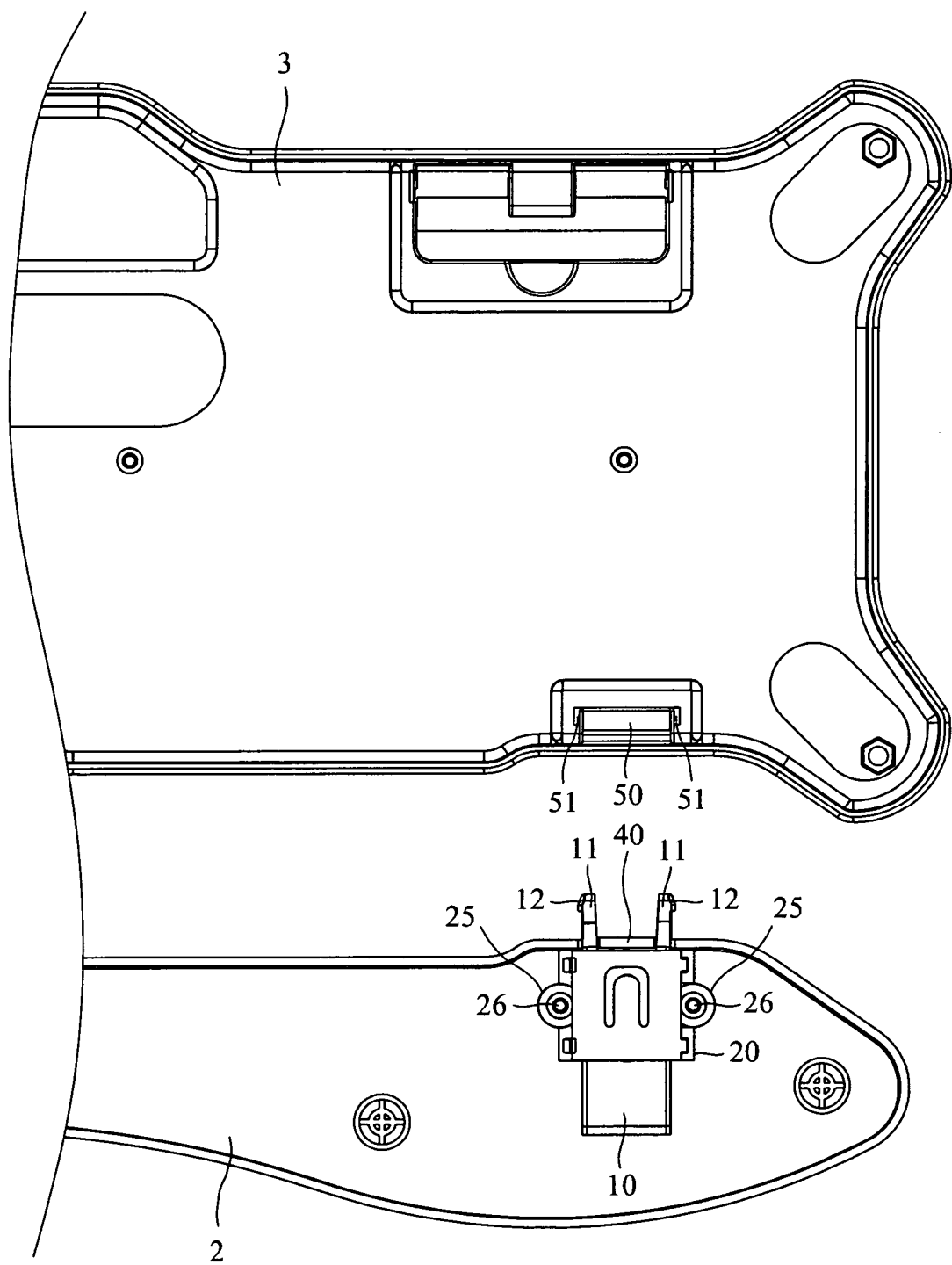
FIG. 4 is a bottom view showing a separated state of the wrist pad base combined with the adjustable wrist pad of the present invention and a keyboard.

Please refer to FIG. 3, and refer to FIG. 4 which is a bottom view showing the connection of a keyboard 3 and the wrist pad base 2 through the adjustable wrist pad 1. A groove 50 is provided at each end of the rear edge of the keyboard 3, with an indentation 51 being provided at each of the two sides of the groove 50. The indentations 51 are provided for engaging the protruding lugs 12 of the engaging portions 11 of the adjustable wrist pad 1. When the keyboard 3 is to be connected to the wrist pad base 2, the adjustable wrist pad 1 is fastened to the wrist pad base 2 via a screw engaging the screw hole 26 of the lug 25 of the wrist pad base 2, and the wrist pad base 2 is connected to the keyboard 3 via the protruding lugs 12 of the engaging portions 11 engaging the indentations 51 of the groove 50 of the keyboard 3.

Figure 5:
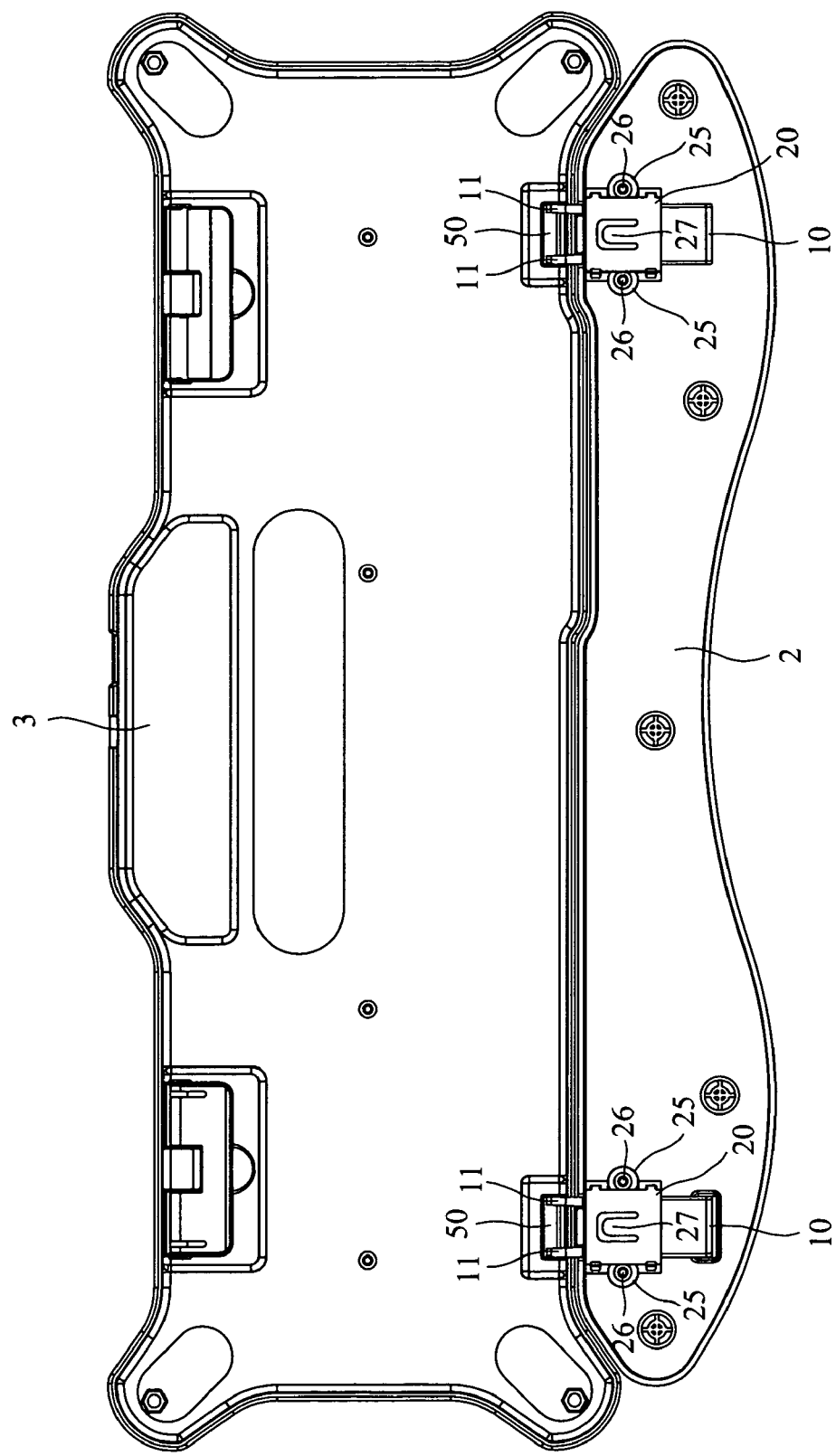
FIG. 5 is a bottom view showing one connection state of the wrist pad base and the keyboard via the adjustable wrist pad.
Figure 6:
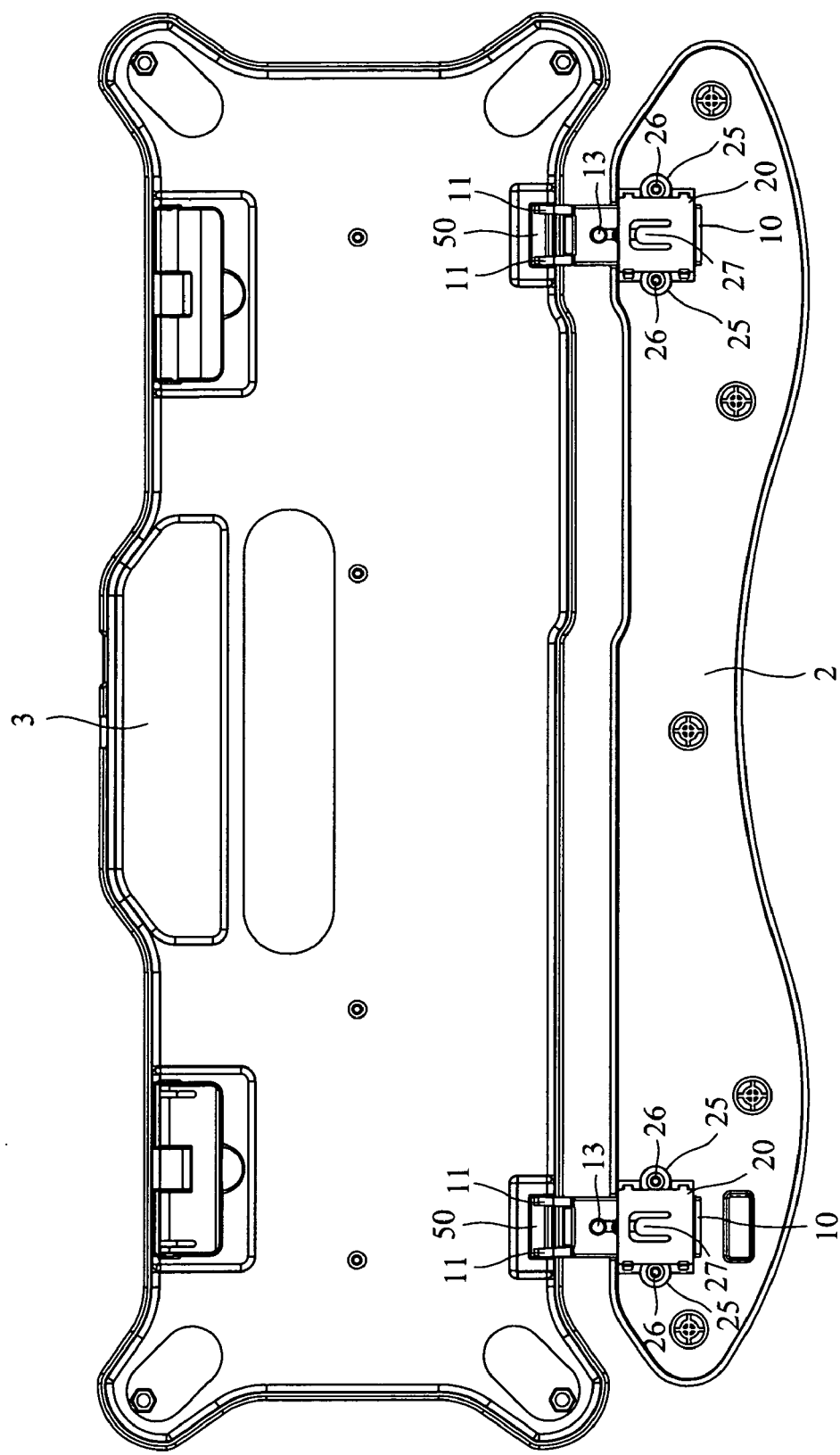
FIG. 6 is a bottom view showing another connection state of the wrist pad base and the keyboard via the adjustable wrist pad.

Please refer to FIG. 5 and FIG. 6, which are bottom views, showing two usage states of the keyboard 3 connected with the wrist pad base 2 via the adjustable wrist pads 1. When the adjustable wrist pad 1 connects the keyboard 3 and the wrist pad base 2 as the state shown in FIG. 5, the projections 28 of the elastic arms 27 are located in the positioning hole 13 closest to the keyboard 3, and the front edge of the wrist pad base 2 is attached to the keyboard 3. When a user desires to adjust the position of the wrist pad base 2 according to his own need, the user only needs to pull down the wrist pad base 2. Thus, for that the lugs 25 of the adjustable wrist pad 1 are engaged to the wrist pad base 2, and that the protruding lugs 12 of the engaging portions 11 are engaged in the indentations 51 of the keyboard 3, pulling the wrist pad base 2 causes the sliding board 10 to move such that the projections 28 located in one of the positioning holes 13 is moved to another one of the positioning holes of the sliding board 10, and thus the wrist pad base 2 provides a height difference. The wrist pad base 2 is adjusted.

Although the present invention has been described in considerable detail with reference to certain preferred embodiments thereof, those skilled in the art can easily understand that all kinds of alterations and changes can be made within the spirit and scope of the appended claims. Therefore, the spirit and scope of the appended claims should not be limited to the description of the preferred embodiments contained herein. For example, the modularized adjustable wrist pad of the present invention can be further utilized for adjusting the wrist pad base of any electric data storage equipment having keystroke-input function. Also, although the mutually corresponding first housing and second housing are both provided with the first locking elements and the second locking elements at their two sides respectively, it is practicable to provide the first locking elements at both of the two sides of the first housing while the second locking elements being provided at both of the two sides of the second housing, and vice versa.

What is claimed is:

1. An adjustable wrist pad, comprising:
a sliding board having a plurality of positioning holes formed therein and an engaging portion extended from each of the two ends of one side of said sliding board; and a fastening base, including a first housing and a second housing mutually corresponding to each other, said first housing being provided with a plurality of first locking elements at one side and a plurality of second locking elements at the other side, said second housing being provided with a plurality of first locking elements at one side and a plurality of second locking elements at the other side, at least one lug having a screw hole being provided between at least one pair of said first locking elements of said first housing and between at least one pair of said second locking elements of said first housing, the at least one lug having a screw hole being provided between at least one pair of said first locking elements of said second housing and between at least one pair of said second locking elements of said second housing, each of said first housing and said second housing being provided with an elastic arm at the middle thereof, a projection being provided on one lower part of said elastic arm of said first housing and corresponding to one of said positioning holes of said sliding board, another projection is provided on one upper part of said elastic arm of said second housing and corresponding to the same positioning hole of said sliding board; wherein by moving said sliding board, said projections corresponding to one said positioning hole are cooperatively moved to another one of said positioning holes, and said wrist pad is adjusted.

2. The adjustable wrist pad as in claim 1, wherein each said engaging portion of said sliding board is provided with a protruding lug engageable with a keyboard.

3. The adjustable wrist pad as in claim 1, wherein said first locking elements are perpendicular to each of said first housing and said second housing, and a hook is provided at one free end of each said first locking element.

4. The adjustable wrist pad as in claim 1, wherein said second locking element is formed of a shoulder having a through hole, respectively extended horizontally from said first housing and second housing.

5. The adjustable wrist pad as in claim 1, wherein said plurality of first locking elements of said first housing are correspondingly engaged with said plurality of second locking elements of said second housing, whereas said plurality of first locking elements of said second housing are correspondingly engaged with said plurality of second locking elements of said first housing.

6. The adjustable wrist pad as in claim 1, wherein said adjustable wrist pad is fastened in a wrist pad base by a screw passing through said screw hole of said lug.

7. The adjustable wrist pad as in claim 1, which is utilized for adjusting the wrist pad base of electric data storage equipment having keystroke-input function.

8. A keyboard connected with a wrist pad base via an adjustable wrist pad, including a keyboard whose bottom base provided with a groove at each end of one side thereof, and at least one indentation provided at each of two ends of said groove; a wrist pad base with a notch provided at each of two ends of the front edge of said wrist pad base; and an adjustable wrist pad, wherein:

said adjustable wrist pad includes a sliding board and a fastening base, said sliding board is provided with a plurality of positioning holes, an engaging portion extended from each of two ends of one side of said sliding board, a protruding lug provided at said engaging portion, and said fastening base comprises a first housing and a second housing mutually corresponding to each other, with a plurality of first locking elements and a plurality of second locking elements respectively disposed at one of two sides of both of said first housing and second housing, one lug having a screw hole provided being positioned between at least one pair of said first locking elements of said first housing and between at least one pair of said second locking elements of said first housing, at least one lug having a screw hole being provided between at least one pair of said first locking elements of said second housing and between at least one pair of said second locking elements of said second housing, each of said first housing and said second housing provided with an elastic arm at the middle thereof, a projection provided on one lower part of said elastic arm of said first housing and corresponding to one of said positioning holes of said sliding board, whereas another projection is provided on one upper part of said elastic arm of said second housing and corresponds to the same positioning hole, said adjustable wrist pad is fastened to said wrist pad base via a screw passing through said screw hole of each said lug, said protruding lug of said each engaging portion engaged in said indentations at both sides of said groove to connect said keyboard and said wrist pad base, by moving said wrist pad base causing said sliding board to move such that said projections are cooperatively moved to another one of said positioning holes to adjust said wrist pad base.

9. The keyboard as in claim 8, wherein said first locking elements are perpendicular to said first housing and said second housing, with a hook being provided at one free end of each said first locking element.

10. The keyboard as in claim 8, wherein said second locking elements are respectively formed of shoulders extended horizontally from said first housing and second housing; a through hole is provided on each said shoulder.

11. The keyboard as in claim 8, wherein said plurality of first locking elements of said first housing is correspondingly engaged with said plurality of second locking elements of said second housing, whereas said plurality of first locking elements of said second housing are correspondingly engaged with said plurality of second locking elements of said first housing.

12. The keyboard as in claim 8, which is utilized for adjusting the wrist pad base of electric data storage equipment having keystroke-input function.

* * * * *